(12) United States Patent
Ahdout et al.

(10) Patent No.: US 7,694,153 B2
(45) Date of Patent: Apr. 6, 2010

(54) CHANGING PRODUCT BEHAVIOR IN ACCORDANCE WITH LICENSE

(75) Inventors: Isaac Ahdout, Bellevue, WA (US);
Martin H. Hall, Sammamish, WA (US);
Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/210,611

(22) Filed: Aug. 24, 2005

(65) Prior Publication Data

US 2006/0136747 A1 Jun. 22, 2006

Related U.S. Application Data

(63) Continuation-in-part of application No. 10/988,907, filed on Nov. 15, 2004.

(51) Int. Cl.
*G06F 11/30* (2006.01)
(52) U.S. Cl. .................. 713/189; 705/50; 705/51; 705/59; 713/1; 713/100; 713/176; 726/1; 726/7; 726/22; 726/26; 726/27
(58) Field of Classification Search .................. 705/50, 705/51, 57, 58, 59; 713/1, 100, 176, 187, 713/188, 189, 193; 726/1, 7, 13, 22, 26; 717/168, 172, 174, 177
See application file for complete search history.

(56) References Cited

U.S. PATENT DOCUMENTS

| | | | |
|---|---|---|---|
| 4,558,176 A | | 12/1985 | Arnold et al. |
| 5,490,216 A | * | 2/1996 | Richardson, III ............. 705/59 |
| 5,724,425 A | | 3/1998 | Chang et al. |
| 5,745,879 A | | 4/1998 | Wyman |
| 5,956,408 A | | 9/1999 | Arnold |
| 6,049,789 A | * | 4/2000 | Frison et al. ................... 705/59 |
| 6,078,909 A | * | 6/2000 | Knutson ....................... 705/59 |
| 6,345,294 B1 | | 2/2002 | O'Toole et al. |
| 6,405,923 B1 | | 6/2002 | Seysen |
| 6,460,140 B1 | * | 10/2002 | Schoch et al. ................. 726/22 |
| 6,567,793 B1 | | 5/2003 | Hicks et al. |
| 7,069,595 B2 | * | 6/2006 | Cognigni et al. .............. 726/26 |
| 7,356,709 B2 | * | 4/2008 | Gunyakti et al. ............ 713/193 |

(Continued)

FOREIGN PATENT DOCUMENTS

WO   WO-98/11478 A2   3/1998

OTHER PUBLICATIONS

International Search Report for PCT/US2006/032708 mailed Jan. 5, 2007.

(Continued)

*Primary Examiner*—Nasser Moazzami
*Assistant Examiner*—Shanto M Abedin
(74) *Attorney, Agent, or Firm*—Marshall, Gerstein & Borun LLP

(57) ABSTRACT

A computer or other electronic device uses a cryptographic capability and hardware identifier to verify a provisioning packet for changing the mode of operation of the device or a licensed component. A secure memory stores the provisioning packet for future reference. A sequence number may be used to limit replay attacks. An exemplary use is conversion of a computer from metered use during a subscription period to unlimited use when the subscription terms have been satisfied.

6 Claims, 4 Drawing Sheets

U.S. PATENT DOCUMENTS

| | | | |
|---|---|---|---|
| 2001/0056539 A1 | 12/2001 | Pavlin et al. | |
| 2002/0144131 A1 | 10/2002 | Spacey | |
| 2003/0110388 A1 | 6/2003 | Pavlin et al. | |
| 2003/0163712 A1* | 8/2003 | LaMothe et al. | 713/189 |
| 2004/0003190 A1 | 1/2004 | Childs et al. | |
| 2004/0044629 A1* | 3/2004 | Rhodes et al. | 705/59 |
| 2004/0054909 A1* | 3/2004 | Serkowski et al. | 713/176 |
| 2004/0139027 A1 | 7/2004 | Molaro | |
| 2004/0268120 A1* | 12/2004 | Mirtal et al. | 713/156 |
| 2005/0015343 A1* | 1/2005 | Nagai et al. | 705/59 |
| 2006/0106920 A1* | 5/2006 | Steeb et al. | 709/220 |
| 2006/0107306 A1* | 5/2006 | Thirumalai et al. | 726/1 |
| 2006/0107335 A1* | 5/2006 | Frank et al. | 726/27 |
| 2006/0130130 A1* | 6/2006 | Kablotsky | 726/9 |

OTHER PUBLICATIONS

"Cyotec—Cyolicence," three pages printed from http://www.cyotec.com/products/cyolicence on Sep. 7, 2005.

"Magic Desktop Automation Suite for the Small and Mid-sized Business," four pages printed from http://www.remedy.com/solutions/magic/magic_it_suite.htm on Sep. 7, 2005.

Pace Antipiracy document, four pages total printed from http://www.paceap.com/psintro.html and http://www.paceap.com/pstop.html on Sep. 7, 2005.

\* cited by examiner

CHANGING PRODUCT BEHAVIOR IN ACCORDANCE WITH LICENSE

This application is a continuation-in-part of U.S. patent application Ser. No. 10/998,907, filed Nov. 15, 2004.

BACKGROUND

Computers and other electronic devices typically are not governed by an overall product license. Components of the computer, such as the operating system or individual application programs are generally licensed for unlimited use after installation. Some specialized applications, particularly engineering tools, may have licenses that govern individual applications on a permanent basis or only allow a certain number of concurrent instances of the application to be present on a given network. However, a business model that puts computers or other electronic devices in the hands of the user for less than a full retail price in exchange for regular subscription payments or pay-per-use credits may have a license that governs the overall system including hardware and software. In some cases, it may be necessary to change the behavior of the system as different licenses or license terms become applicable to both the overall device and/or individual components.

SUMMARY

A computer adapted for pay-per-use operation or operation governed by license terms may have a cryptographic unit and a tamper-resistant memory storing a hardware identifier and a cryptographic key for use in converting the computer from a first licensing mode of operation to a second licensing mode of operation. In the first licensing mode of operation the computer may receive provisioning packets representative of payments made in exchange for use of the computer under a given set of terms, for example metered use by time. One embodiment of such a pay-per-use computer may allow the computer to revert to unlimited use operation at the completion of a contractual term. In this case, a special-purpose provisioning packet may be used to change the operationing mode from metered to non-metered. In another embodiment, the special purpose provisioning packet may relate to non-metered licensing terms, such as product bundles, hardware configuration, or peripheral usage.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
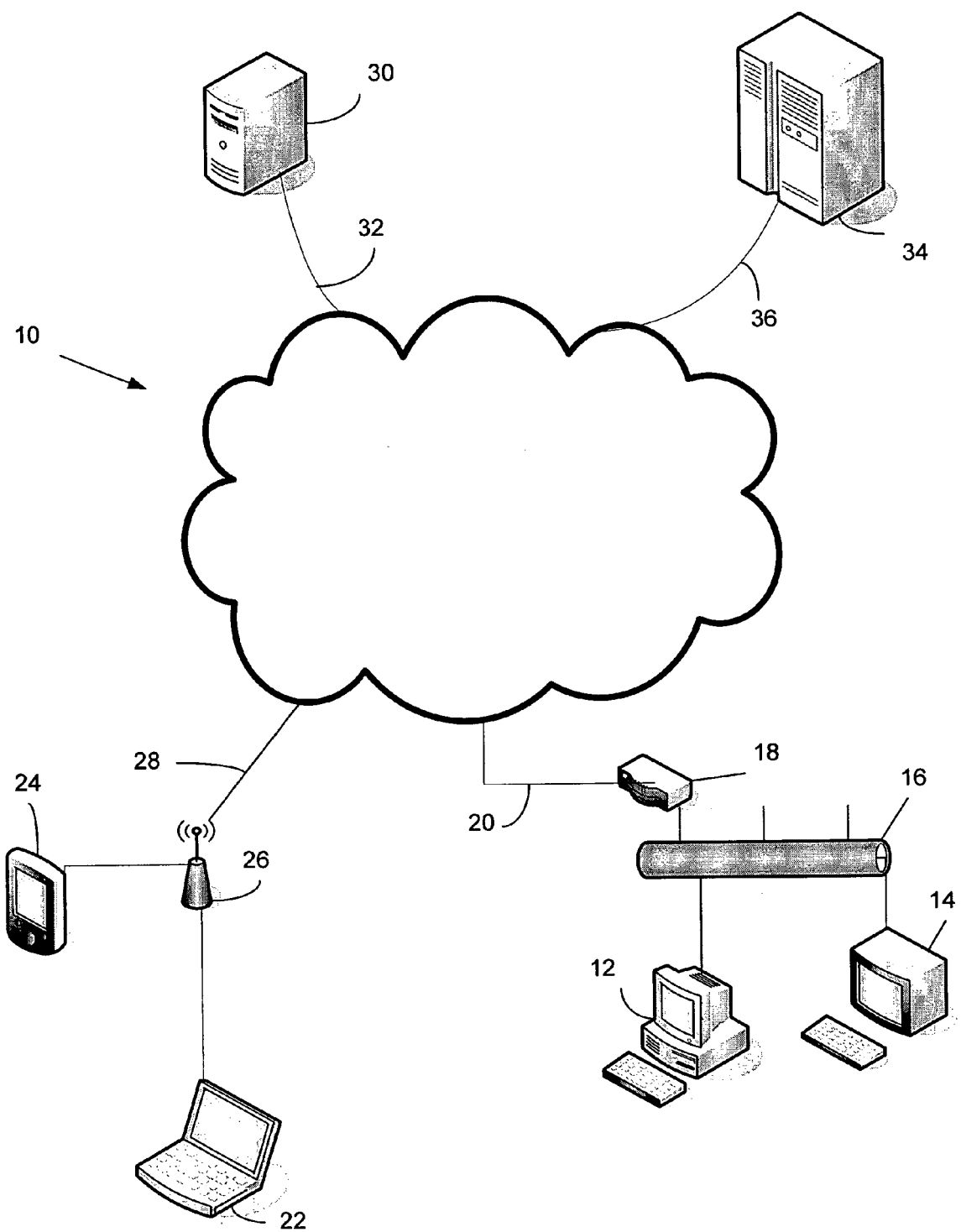
FIG. 1 is a simplified and representative block diagram of a computer network.

FIG. 1 illustrates a network 10 that may be used to implement a dynamic software provisioning system. The network 10 may be the Internet, a virtual private network (VPN), or any other network that allows one or more computers, communication devices, databases, etc. to be communicatively connected to each other. The network 10 may be connected to a computer 12, such as a personal computer and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30, such as a proxy server or edge server may be connected to the network 10 using a communication link 32 and a web server 34 may be connected to the network 10 using another communication link 36.

Figure 2:
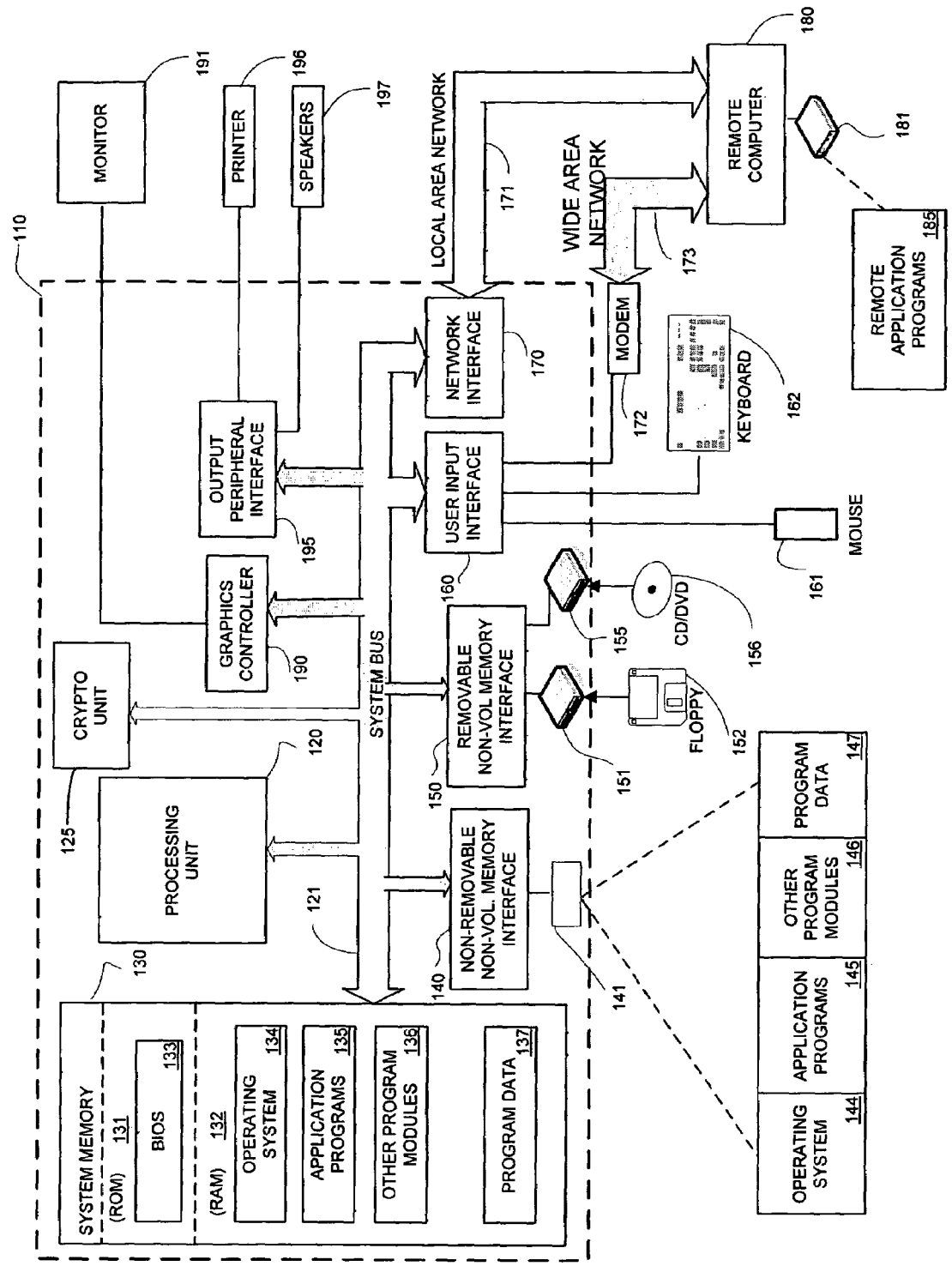
FIG. 2 is a simplified and representative block diagram of a computer.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. The cryptographic unit 125 may have a calculation function that may be used to verify digital signatures, calculate hashes, digitally sign hash values, and encrypt or decrypt data. The cryptographic unit 125 may also have a protected memory for storing keys and other secret data, such as an identification indicia, for example, an identifier representative of the computer or processing unit 120. Another function supported by the cryptographic unit 125 may be digital rights management, that in its simplest form is a variation of encryption. The cryptographic unit may also include a timer or clock (not depicted) to support expiration dates and some usage limits. The cryptographic unit may be physically located within the processing unit 120 or be a separate component within the computer 110. In other embodiments, the functions of the cryptographic unit may be instantiated in software and run via the operating system.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions; data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135; other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 1110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
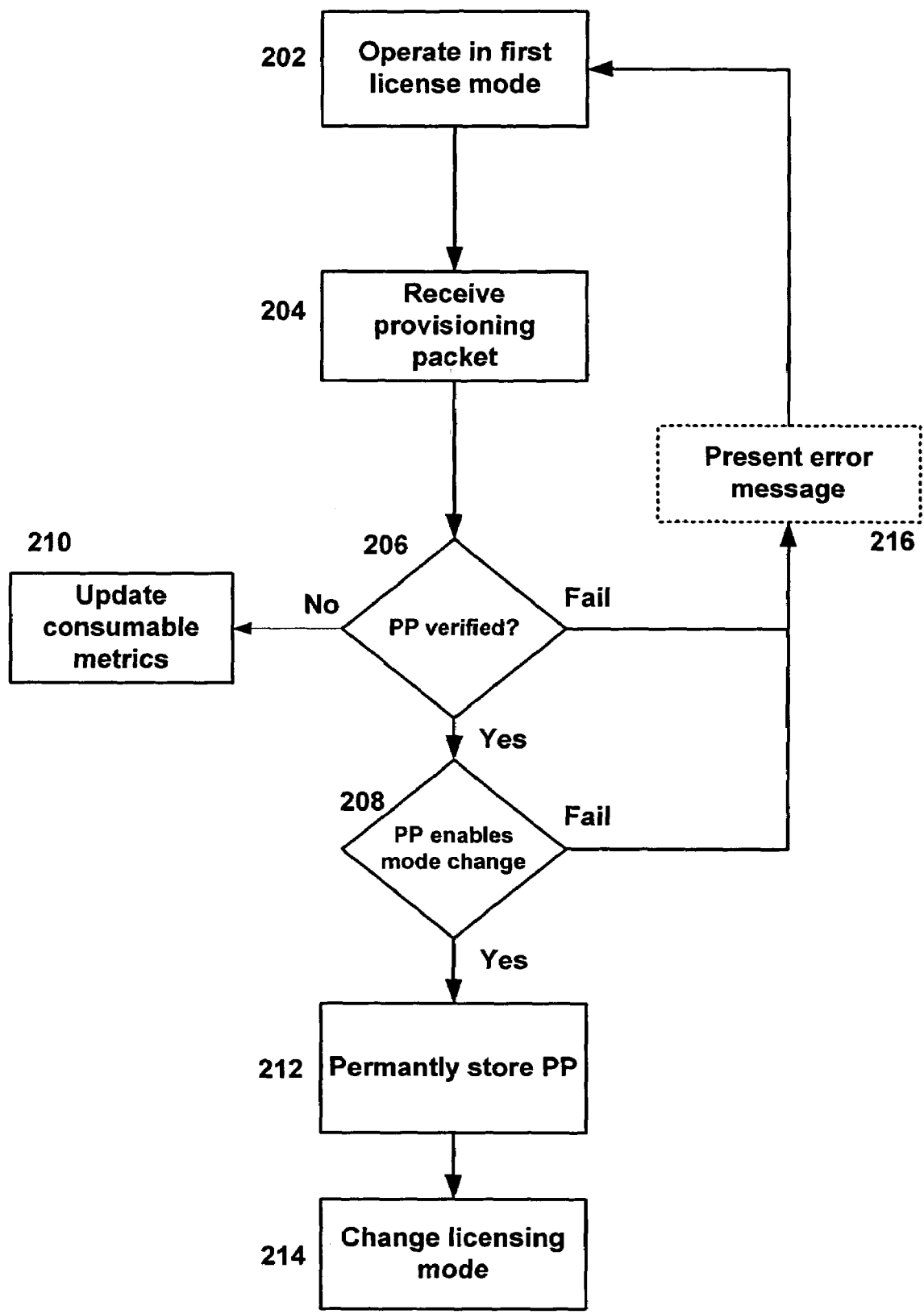
FIG. 3 is a flow chart depicting a method for changing operating licensing mode.

FIG. 3 is a flow chart depicting a method for changing operating licensing modes using provisioning packets. The computer may be operating in a first license mode at block 202, for example, metered use per unit of time. A provisioning packet may be received at block 204 via any conventional means, for example, over a network, using removable media, or entered manually. The provisioning packet may be generated at a server corresponding to a service provider or other licensing agent associated with the metered operation of the computer 110. The provisioning packet may be verified at block 208 using cryptographic means well known in the industry, such as public-key cryptography using a locally stored public-key corresponding to a private key used to generate the provisioning packet. When the provisioning packet is verified at block 206, the yes branch may be followed to block 208 where it may be determined if the provisioning packet enables a mode change or simply contains data corresponding to continued use in the current mode. When the provisioning packet relates to current mode usage (e.g. metering), the no branch from block 208 may be followed to block 210, and normal processing of consumable packets followed.

When the provisioning packet enables a mode change, the yes branch from block 208 may be taken and the provisioning packet may be permanently stored at block 212. Because the provisioning packet used to change modes is not consumed it may be stored permanently for reference by policy management functions. In contrast, a consumable packet may simply add value to a metering or stored value function and may then be discarded. The provisioning packet may then be processed: at block 214 to effect the change in licensing mode. In one embodiment, the change in licensing mode may be accomplished by updating policy data in a secure memory corresponding to license administration and enforcement, such as cryptographic unit 125. When either the provisioning packet verification fails at block 206 or when the provisioning packet does not correspond to a valid license or mode change at block 208, alternate paths may be taken from the fail branches of blocks 206 or 208 for other processing such as presentation of an error message to be performed at block 216 before operation continues in the first license mode at block 202.

Figure 4:
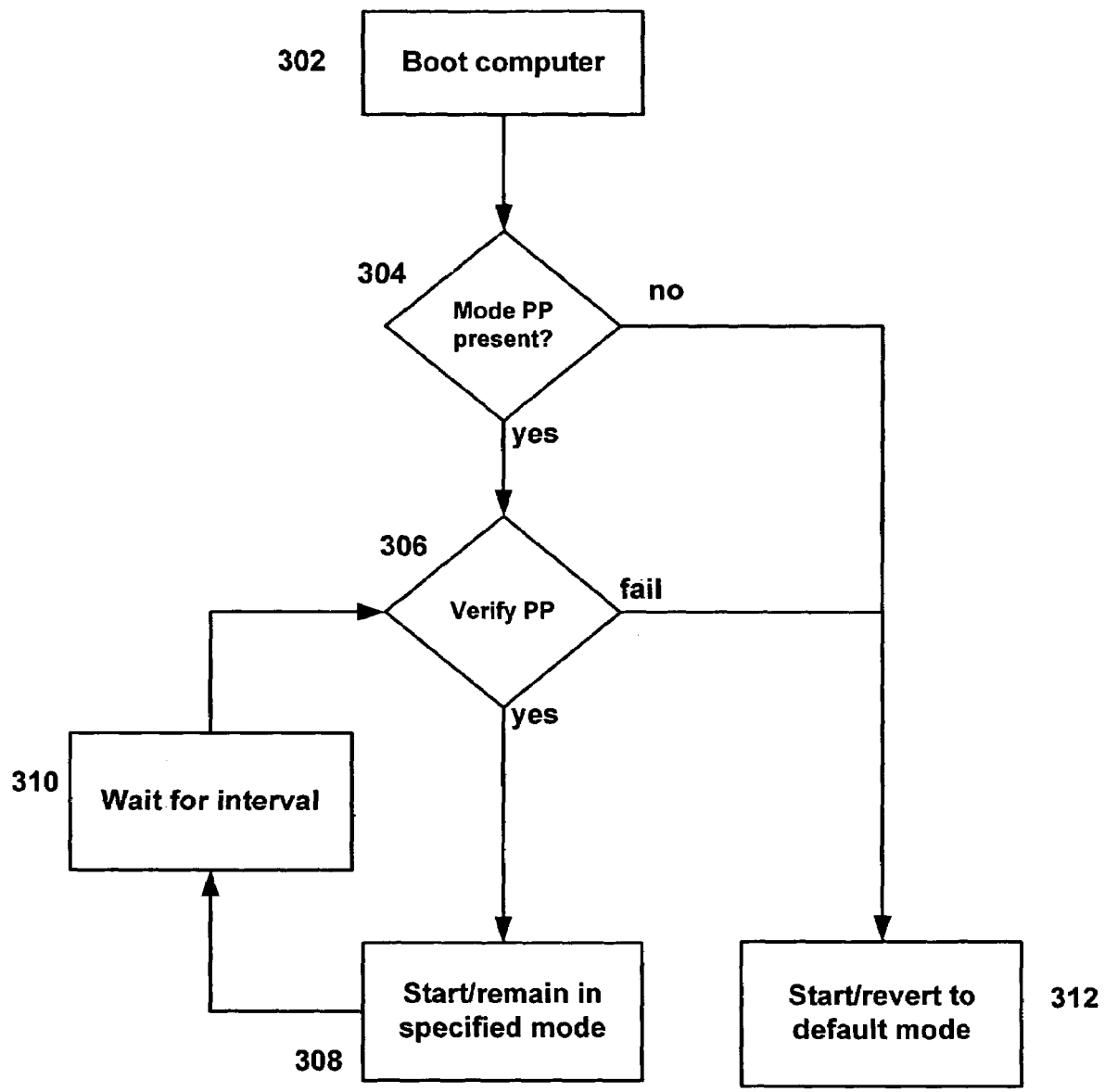
FIG. 4 is a flow chart depicting a method of booting a computer in the presence of a provisioning packet.

FIG. 4 is a block diagram depicting a method of booting and operating a computer, such as computer 110, in the presence of a license provisioning packet. At block 302, the computer may be booted following a generally standard process. At block 304 an examination may be made to determine the presence of a permanent provisioning packet in the system (see block 212 of FIG. 3). As mentioned above, license mode provisioning packets may be permanently stored for reference during boot or at other points in the operation of the computer 110. When the determination is made at block 304 that a provisioning packet is present, the yes branch may be followed to block 306 and the provisioning packet may be verified using the same cryptographic process followed with respect to FIG. 3. When the provisioning packet is successfully verified the yes branch may be followed to block 308 where the computer may complete the boot process in the mode specified by the verified provisioning packet. The computer may then operate in accordance with the licensing mode specified in the provisioning packet until an interval has expired at block 310. The interval may be set corresponding to the desires of the service provider in keeping with the estimated risk of fraud. For example, the interval may be relatively short, such as one-hour or may be relatively long, such as one-month, although almost any interval could be realistically used.

At the expiration of the interval at block 310, the provisioning packet may be re-verified at block 306 to determine if the provisioning packet is valid. This may occur at a routine interval in the course of operation. The provisioning packet may be securely stored in memory associated with the cryptographic unit 125. Alternately, the provisioning packet may be signed and/or encrypted and stored in non-secure memory such as the disk drive 151. When validity is confirmed, the computer may remain in the specified mode at block 308 and the loop repeated at the interval defined. In some embodiments, the expiration of the intervals may also trigger contact with a service provider or other host to confirm system status, update availability, the interval setting, and system configuration settings.

If there is no provisioning packet present, the no branch from block 304 may be followed to block 312 and the computer will be started in the default mode according to the current settings. When a provisioning packet is present but fails to verify at block 306, the fail branch from block 306 may be taken to block 312 where the computer may be reverted to the default mode for operation, such as usage metering. If desired, a new provisioning packet may be presented using the process described with respect to FIG. 3.

In the case where the provisioning packet represents updated licensing terms, such as a bundle, a sequence number may be included in the provisioning packet. The use of a sequence number helps prevent replaying the same packet in violation of license terms. For example, a user may receive a provisioning packet with a license for an office tool suite that allows use of a word processor, a spreadsheet, and a presentation program, pending receipt of payment. The provisioning packet may allow full use of the office suite bundle. However, after period of time, if no payment is received, the office suite bundle provider may issue a second provisioning packet that supersedes the original. The sequence number, stored securely, may be used to prevent the user from replaying the original provisioning packet to regain access to the office suite bundle.

The use of provisioning packets for individual licensing may be incremental, for example, in the case above, individual tools such as a spreadsheet may be added or deleted from the office suite bundle. Similarly, other settings such as memory configuration, number of active processors, processor speed, or individual authorization, deauthorization, and configuration for software packages or hardware components may be delivered using license-oriented provisioning packets following steps the same as or similar to those described with respect to FIG. 3 and FIG. 4. When used for more than overall system licensing, it can be seen that a multiplicity of provisioning packets may be permanently stored with respect to various aspects of licensing for the computer 110. The provisioning packets may be broad, allowing unlimited use of all the resources of the computer, or may be narrow, specifying, for example, the number of documents that may be simultaneously opened in a word processor.

By following a process such as that described above, users benefit by being able to change the operational characteristics of the computer once subscription terms are satisfied or when desiring to change the features and functions of their computer 110. Similarly, service providers or other interested parties may update the features and functions of computers under their control without the need for costly service visits and the associated customer service overhead. Use of these techniques allow new business models that contemplate dramatically lowering the barriers of affordable computing.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of setting a system configuration for a pay-per-use that uses consumable packets for adding value consumed in the metered use of an electronic device or a component of the electronic device and that uses a license mode packet for configuring hardware, software, and metering of the electronic device comprising:

storing, in a tamper-resistant fashion, a hardware identifier associated with the electronic device;
   storing, in a tamper-resistant fashion, a public key;
   receiving a first provisioning packet;
   storing the first provisioning packet, the first provisioning packet digitally signed and including the hardware identifier;
   verifying the digitally signed first provisioning packet using the public key;
   determining that the first provisioning packet is a consumable packet;
   adding a value associated with the first provisioning packet to a stored value function;
   discarding the first provisioning packet after adding the value;
   consuming the value from the stored value function through use of the computer at a metered rate;
   receiving a second provisioning packet;
   storing the second provisioning packet, the second provisioning packet digitally signed and including the hardware identifier;
   verifying the digitally signed second provisioning packet using the public key;
   determining that the second provisioning packet is a license mode provisioning packet;
   permanently storing the license mode provisioning packet;
   evaluating the license mode provisioning packet upon booting the electronic device for system configuration information; and
   configuring the electronic device for operation in accordance with the system configuration information found in the license mode provisioning packet, wherein the system configuration information overrides a previous configuration of the electronic device.

2. The method of claim 1, wherein configuring the electronic device for operation in accordance with configuration information found in the license mode provisioning packet comprises at least one of setting a memory configuration, setting a number of active processors, setting a processor speed, authorizing a software package for operation, setting a software package configuration, authorizing a hardware component for operation, and setting a hardware component configuration.

3. The method of claim 1, wherein configuring the electronic device for operation in accordance with configuration information found in the license mode provisioning packet comprises at least one of de-authorizing a software package for operation and de-authorizing a hardware component for operation.

4. The method of claim 1, wherein configuring the electronic device for operation in accordance with configuration information found in the license mode provisioning packet comprises deactivating the metering process on the electronic device.

5. The method of claim 4, further comprising re-verifying the digitally signed provisioning packet at an interval when the system configuration information in the license mode provisioning packet comprises permanently deactivating the metering process on the electronic device.

6. The method of claim 1, further comprising storing a last sequence number wherein the first and second provisioning packets each include a new sequence number and a new provisioning packet is verified only if the new sequence number is greater than the last sequence number.

* * * * *